Dec. 13, 1966  G. G. HAVENS  3,291,181
WHEELS FOR EXPLORING THE SURFACE OF THE MOON
Filed April 14, 1965  2 Sheets-Sheet 1
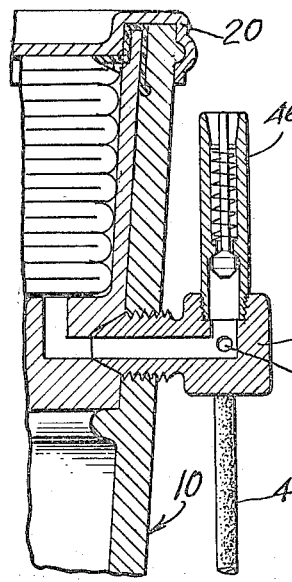
FIG. 6
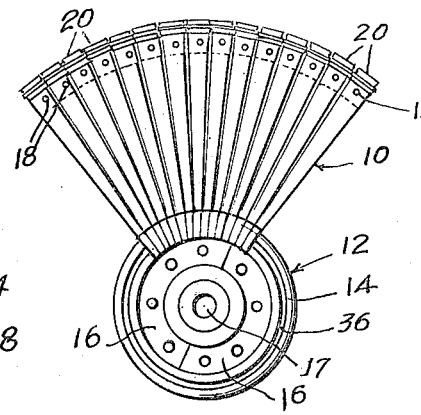
FIG. 1
FIG. 2
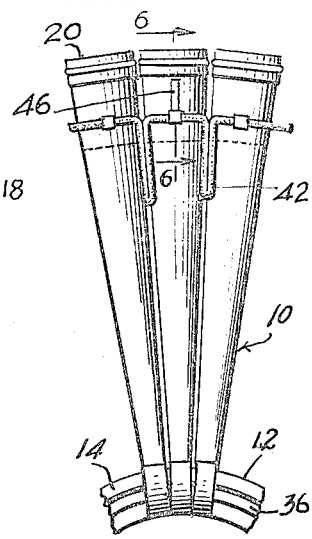
FIG. 5
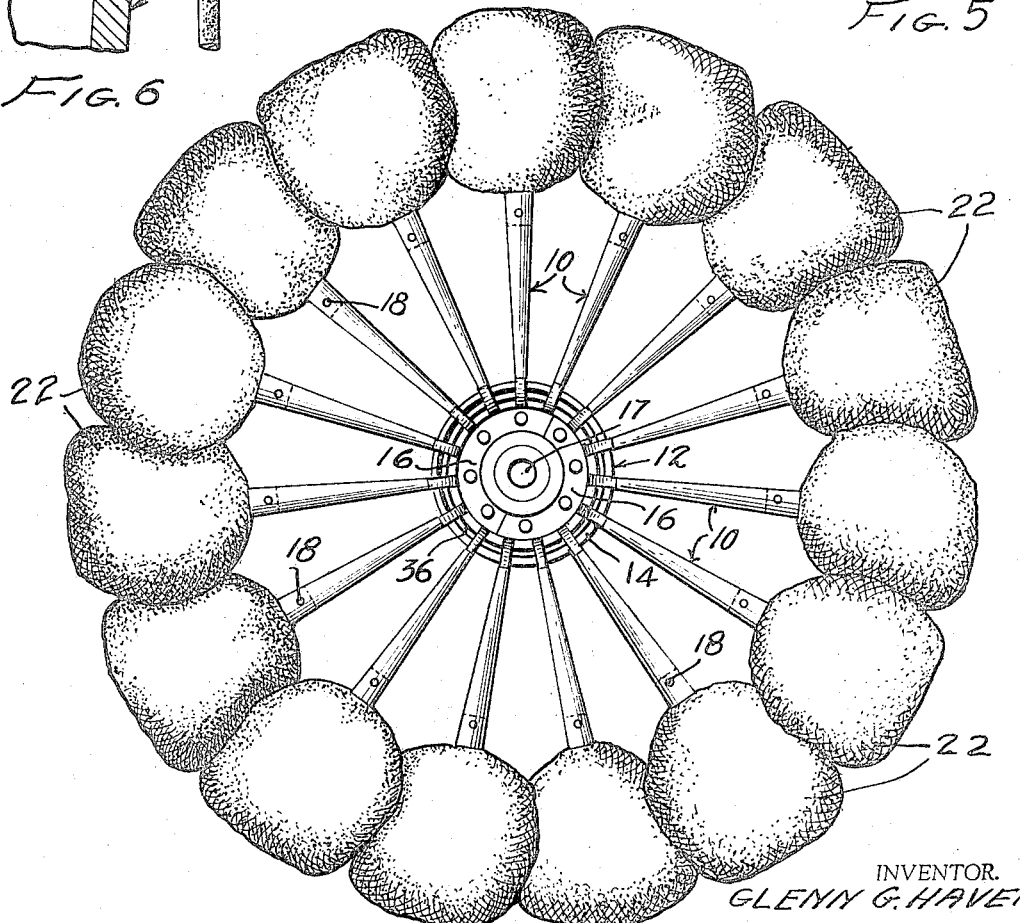
INVENTOR.
GLENN G. HAVENS
BY Lyon & Lyon
ATTORNEYS

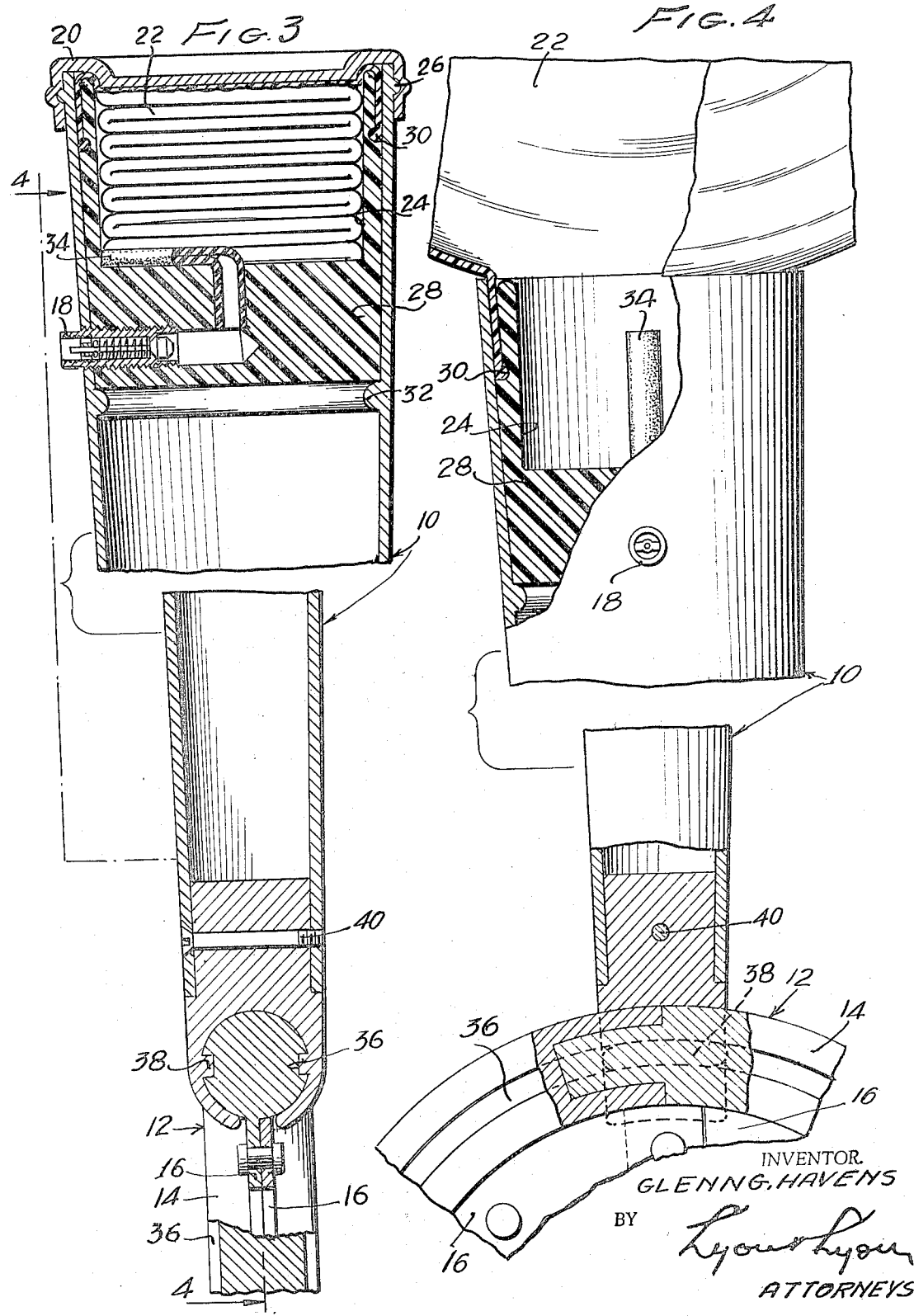

United States Patent Office 3,291,181
Patented Dec. 13, 1966

3,291,181
WHEELS FOR EXPLORING THE SURFACE OF THE MOON
Glenn G. Havens, San Diego, Calif., assignor to Whittaker Corporation, Los Angeles, Calif., a corporation of California
Filed Apr. 14, 1965, Ser. No. 448,189
6 Claims. (Cl. 152—337)

This invention relates to a novel wheel structure particularly adapted for use on vehicles intended for operation on rough craggy surfaces, such as exist on the moon.

For the foreseeable future the payload volume of a space vehicle will be restricted. Therefore, it will not generally be feasible to send bulky packages into space. However, the exploration of the moon and the planets will require the use of fairly large structures. Illustrative of such structures is a wheel for a vehicle to be used in the exploration of the surface of the moon. In addition to compactness during shipment to the moon, the wheels on the vehicle designed for moon exploration must be capable of meeting the condition encountered on the surface of the moon. It is probable that the surface of the moon is soft and at the same time covered with jagged particles. A wheel for use on such a surface should be large in diameter and soft enough to allow it to deform over sharp particles without being cut. According to the present invention there has now been developed a wheel construction which is sufficiently compact for packaging in a restricted space in a space vehicle and yet is capable of being expanded from a small package into a useable wheel capable of meeting the conditions encountered on the moon surface.

It is an object of this invention to prepare a novel wheel construction.

Another object of this invention is to provide a wheel construction which is sufficiently small for carrying in a space vehicle and yet is capable of being expanded from a small package into a useable wheel.

Still another object of this invention is the provision of a wheel of large diameter which is soft enough to allow it to deform over sharp particles without being cut.

These and other objects of this invention will be apparent in detailed description which follows.

The expanded wheel of the present invention generally comprises a hub from which extends radially a plurality of spokes which taper from a small diameter at the hub to a large diameter at the outer end. Attached to the outer end of each spoke is a balloon. Generally the balloons are of such dimension that they form a periphery or rim for the wheel. In the unexpanded state, the balloons are retracted completely within the outer section of the spokes. For compact packaging the spokes can then be rotated around the periphery of the hub in such a fashion that all of the spokes lie within one 90° quadrant.

The novel wheel construction of this invention will be more clearly understood by reference to the accompanying drawings in which:

FIGURE 1 is a side view of the wheel of this invention in unexpanded state with the balloons retracted within the outer section of the spokes and all of the spokes rotated to lie within a 90° quadrant.

FIGURE 2 is a side view of the device of FIGURE 1 in expanded form.

FIGURE 3 is a cross sectional view of one of the spokes with the center portion omitted and the balloon unexpanded.

FIGURE 4 is a partial cutaway view of one of the spokes taken along the line 4—4 in FIGURE 3 with the balloon expanded.

FIGURE 5 is another embodiment of the invention shown in a partial side view with the wheel in the unexpanded state.

FIGURE 6 is a cross-sectional view taken along the line 6—6 in FIGURE 5.

As shown in FIGURE 1, the wheel is on unexpanded form with all of the spokes 10 rotated about the hub 12 so as to be positioned in a single quadrant. The hub 12 has a notched outer portion or rim 14. Affixed to the rim are the two inner portions 16, the center of which 17 is open and adapted to receive an axle. Each of the spokes is fitted with a valve 18 to permit the introduction of gas into the outer portion of the spoke to inflate the balloon contained therein. Each spoke is covered at the outer end by a cap 20. The caps are adapted to be removed when the wheel is in the expanded form.

As shown in FIGURE 2 when the wheel is expanded the spokes 10 slide around the hub 12 in the notched rim portion 14. The expanded balloons 22 form a continuous outer periphery for the wheel.

The construction of the spokes 10 is shown in greater detail in FIGURES 3 and 4. As in shown in FIGURE 3 the balloon 22 in unexpanded form is held within a recess 24 in the end of the spoke 10. The end of the spoke is closed by cap 20 held in place by bead 26. Recess 24 is formed by the plastic member 28, which snugly fits against the sides of the walls of the spoke and also holds the lower end 30 of the balloon 22. If necessary, adhesive may be applied to the lower end 30 in order to further secure the balloon to the end of the spoke. The plastic member 28 is held in place by the gas-tight seal 32. Also contained in the plastic member 28 is valve 18, which is in communication with gas tube 34 which permits the introduction of pressurized gas to the balloon. Also shown in FIGURE 3 is the connection of the spoke to the hub. As shown the rim portion 14 of the hub has a notch 36, in which is received insert 38, which is fitted into the lower portion of the spoke and securely held by a screw 40. Turning to FIGURE 4 it can be seen that when balloon 22 is in inflated form, the gas tube 34 is unfolded to permit the passage of gas to the interior of the balloon via valve 14. Recess 24 is thereby emptied.

In FIGURE 5 is shown another embodiment of the invention where there is provided a single gas inlet valve rather than individual valves for each spoke as in the embodiment shown in FIGURES 1 through 4. In FIGURE 5, each of the spokes 10 is connected to gas tubing 42 via T connections 44. The single gas inlet valve 46 permits the simultaneous addition of gas to all of the balloons. The construction of this valve is shown in greater detail in FIGURE 6. It will be seen that valve 46 is in communication with both tubing 42 permitting passage of gas to the other spokes, and passage 48, which permits the introduction of gas to the spoke adjoining the gas inlet valve.

In operation, the embodiment shown in FIGURES 1 through 4 may be carried or transported in the unexpanded form as shown in FIGURE 1. When it is desired to use the wheel, each of the balloons may be inflated by the introduction of the air carbon dioxide, or any similar gas through valve 18. Prior to the introduction of gas the caps 20 may be removed. However, this is generally not necessary since the gas pressure will force the caps off the ends of the spokes. As the gas is introduced, the wheel gradually takes the form shown in FIGURE 2 with the individual spokes being rotated around the hub as the result of the interference between the various inflated balloons.

When employing the embodiment shown in FIGURES 5 and 6, the balloons may be expanded simultaneously by the application of gas to the single gas inlet valve 46. In this way, the device may be converted from the unexpanded form to the expanded form in a single operation.

The materials used in the construction of the wheel of this invention are chosen based upon considerations of environmental space exposure, physical strength properties, weight and the like. The selection of these materials does not constitute a part of this invention. However, it will be understood that the proper selection of materials does bear on the practical use of the invention. For example, considering the materials presently available, the balloons should be made of such a material that they can be inflated to a preformed shape rather than undergoing substantial stretching during the inflation process. It is believed that balloons of preformed shape will be better able to withstand the effect of the jagged particles encountered on the moon surface. The balloons may generally be of thin-walled construction since the low gravitational force on the moon permits the use of low pressures for inflation of the balloons.

Although the dimensions of the various components of the wheel of this invention are not critical, generally the spokes would be approximately two to three inches in diameter and from three to about five feet in length. The balloons at the end of each spoke would be from two to three feet in diameter.

While the invention has been described with particular reference to the drawings, it will be understood that many variations thereon are possible within the scope of the invention. Basically, the invention concerns itself with the mechanism of expansion of a compact package to form a wheel, preferably created by the interference of balloons positioned at the end of the spokes of the wheel.

Having fully described the invention it is intended that it be limited solely by the scope of the appended claims.

I claim:

1. A wheel comprising a hub, extending radially from said hub and slidably connected for circumferential movement with respect thereto, a plurality of uniformly spaced tapered hollow spokes, at the outer extremity of each of the said spokes, an expanded balloon, each of said balloons being sufficiently large to interfere with the adjacent balloons such that the balloons are deformed against each other all the way around the wheel to form a continuous periphery, each of said spokes tapering from a small diameter at the hub to a diameter sufficiently large to contain a deflated balloon at its outer end.

2. A wheel comprising a hub, extending radially from said hub, a plurality of uniformly spaced tapered hollow spokes, at the outer extremity of each of the said spokes, an expanded balloon, each of said balloons being sufficiently large to interfere with the adjacent balloons such that the balloons are deformed against each other all the way around the wheel to form a continuous periphery, each of said spokes tapering from a small diameter at the hub to a diameter sufficiently large to contain a deflated balloon at its outer end, said balloons when deflated being receivable in the outer end of said spokes, and said spokes being slidably connected to said hub whereby they may be rotated around said hub until all of said spokes lie within a single 90° quadrant.

3. A device expansible to form a wheel comprising a hub, slidably mounted for circumferential movement on said hub a plurality of spokes, each of said spokes containing a deflated balloon within its outer end, said spokes being adapated to be arranged such that all of the spokes lie within a single 90° quadrant.

4. A device expansible to form a wheel comprising a hub, slidably mounted for circumferential movement on said hub a plurailty of spokes, each of said spokes tapering from a small diameter at the hub to a diameter sufficiently large to contain a deflated balloon at its outer end, within the outer end of each spoke, a deflated balloon, said spokes being adapted to be arranged such that all of the spokes lie within a single 90° quadrant.

5. A device expansible to form a wheel comprising a hub, slidably mounted for circumferential movement on said hub a plurality of spokes, each of said spokes tapering from a small diameter at the hub to a diameter sufficiently large to contain a deflated balloon at its outer end, within the outer end of each spoke, a deflated balloon, on each of said spokes gas inlet means adapted to permit gas to be supplied to the balloon, said spokes being adapted to be arranged such that all of the spokes lie within a single 90° quadrant.

6. A device expansible to form a wheel comprising a hub, slidably mounted for circumferential movement on said hub a plurality of spokes, each of said spokes tapering from a small diameter at the hub to a diameter sufficiently large to contain a deflated balloon at its outer end, within the outer end of each spoke, a deflated balloon, on one of said spokes gas inlet means, and in communication with said gas inlet means, gas conducting means for carrying gas to each balloon, said spokes being adapted to be arranged such that all of the spokes lie within a single 90° quadrant.

References Cited by the Examiner

UNITED STATES PATENTS

| | | | |
|---|---|---|---|
| 581,278 | 4/1897 | Goddard | 180—8 |
| 584,218 | 6/1897 | Goddard | 152—334 X |
| 719,023 | 1/1903 | Miller | 152—334 |
| 756,290 | 4/1904 | Sayer | 301—5 |
| 2,859,791 | 11/1958 | Pellegrino | 152—334 |

FOREIGN PATENTS

| | | |
|---|---|---|
| 111,070 | 6/1964 | Czechoslovakia. |

BENJAMIN HERSH, *Primary Examiner.*

RICHARD J. JOHNSON, *Examiner.*